United States Patent [19]

McCallister et al.

[11] Patent Number: 4,611,333
[45] Date of Patent: Sep. 9, 1986

[54] APPARATUS FOR DESPREADING A SPREAD SPECTRUM SIGNAL PRODUCED BY A LINEAR FEEDBACK SHIFT REGISTER (LFSR)

[75] Inventors: Ronald D. McCallister, Scottsdale; Bruce A. Cochran, Mesa; Mary A. Bogner, Scottsdale, all of Ariz.

[73] Assignee: Motorola, Inc., Schaumburg, Ill.

[21] Appl. No.: 718,406

[22] Filed: Apr. 1, 1985

[51] Int. Cl.⁴ .............................................. H04K 1/00
[52] U.S. Cl. ........................................ 375/1; 375/115; 370/107
[58] Field of Search .................. 375/1, 2.1, 2.2, 45, 375/89, 115; 371/37, 38; 370/107; 455/1, 26, 27; 178/22.01

[56] References Cited

U.S. PATENT DOCUMENTS

| | | | |
|---|---|---|---|
| 3,648,237 | 3/1972 | Frey, Jr. et al. | 375/115 |
| 3,947,634 | 3/1976 | Betts | 375/1 |
| 4,017,798 | 4/1977 | Gordy et al. | 375/1 |
| 4,361,891 | 11/1982 | Lobenstein et al. | 370/107 |
| 4,453,249 | 6/1984 | Roth et al. | 371/37 |
| 4,517,679 | 5/1985 | Clark et al. | 375/1 |

Primary Examiner—Robert L. Griffin
Assistant Examiner—Stephen Chin
Attorney, Agent, or Firm—Eugene A. Parsons

[57] ABSTRACT

In despreading a received spread spectrum signal, spread by means of a linear feedback shift register, the signal is demodulated and filtered and then applied to a predictor for estimating the length, connection polynominal and contents in accordance with the Berlekamp-Massey iterative algorithm. The estimates are then applied to a local LFSR to produce a despreading random signal which is mixed with the received signal to remove the spreading factor. The instantaneous total energy of the output signal is measured and when the estimations are correct, the total energy will exceed a predetermined limit and a signal is supplied to the predictor to indicate that the estimates are correct.

10 Claims, 4 Drawing Figures

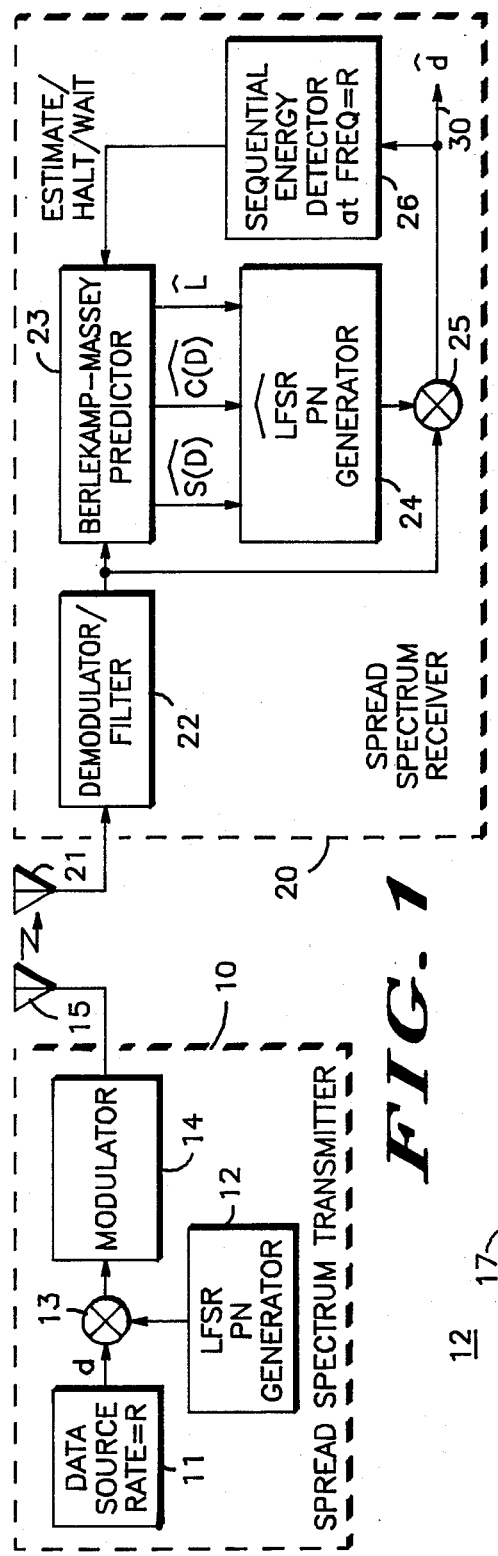
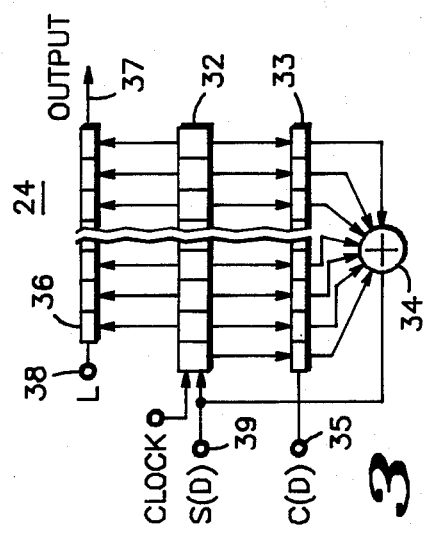
FIG. 1
FIG. 2
FIG. 3
FIG. 4

APPARATUS FOR DESPREADING A SPREAD SPECTRUM SIGNAL PRODUCED BY A LINEAR FEEDBACK SHIFT REGISTER (LFSR)

BACKGROUND OF THE INVENTION

Spread spectrum signals are utilized for a variety of reasons in the communications art. For example, spreading the signal over a larger spectrum reduces the energy density at any specific frequency or band of frequencies and substantially reduces the radiation effects. Also, spread spectrum signals are utilized for security in communictions since a spread spectrum signal is relatively difficult to despread.

In the prior art estimates are made as to each new bit received. The number of correct estimates is recorded in a histogram an when a sufficient number of correct estimates is recorded, the histogram exceeds a threshold indicating that the correct spreading code has been determined. The major problem with this prior art method is that it takes too much time since thousands of correct answers must be obtained before the correct spreading code can be determined. Further, this method does not give synchronization so that even after the spreading code has been determined it must be synchronized with the incoming signal, which requires substantial additional time.

SUMMARY OF THE INVENTION

The present invention pertains to apparatus and method for despreading spectrum signal produced by a linear feedback shift register (LFSR). The apparatus includes means for receiving a spread spectrum signal and demodulating and filtering the signal to remove the carrier as well as excess noise and the like. The apparatus further includes a predictor for estimating the length, the connection polynominal and the contents of the shift register utilized in spreading the signal. These estimates are then applied to a variable length LFSR to simulate the spreading signal, which simulation is mixed with the received signal as a despreading signal. The instantaneous total energy of the mixed signal is then measured and when this instantaneous energy exceeds a predetermined level the despreading is complete and the estimates are correct. The despreading signal can then be used to despread the remainder of the received signal.

It is an object of the present invention to provide new and improved apparatus for despreading a spread spectrum signal produced by an LFSR.

It is a further object of the present invention to provide a new and improved method for despreading a spread spectrum signal produced by an LFSR.

It is a further object of the present invention to provide apparatus and method for despreading a spread spectrum signal which is faster and more accurate than the prior art apparatus and methods.

It is a further object of the present invention to provide apparatus and method for despreading a spread spectrum signal which not only provides the spreading code but also provides synchronization of the spreading code with the received signal.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 is a simplified block diagram of a communications system emboding the present invention;

FIG. 2 is a more detailed block diagram of a portion of FIG. 1;

FIG. 3 is a more detailed block diagram of a portion of FIG. 1; and

FIG. 4 is a graphic presentation of the operation of a portion of FIG. 1.

DESCRIPTION OF THE PREFERRED EMBODIMENT

Referring specifically to FIG. 1, the numeral 10 generally designates a spread spectrum transmitter having a data source 11, a pseudo random noise generator 12, a mixer 13, a modulator 14 and an antenna 15. Data from source 11 is mixed with he pseudo random noise signal from generator 12 in mixer 13 to produce a spread spectrum signal. This spread spectrum signal is modulated on a carrier in modulator 14 and supplied to antenna 15 for transmission.

Pseudo random noise generator 12 is a linear feedback shift register (LFSR) similar to that shown in FIG. 2. Generator 12 includes a shift register 17 having a plurality of stages (in this example 7) with an input for receiving clock pulses, or other periodic pulses, and an output. Further, the outputs of one or more stages are added in a modulo 2 adder 18 and the sum signal is fedback to the input of shift register 17. The particular stages of the shift register which are supplied to adder 18 are generally referred to in the art as the coefficients, or polynominals. The connection polynominal (or stages connected to adder 18) of shift register 17 is an important factor which must be obtained to properly decode data received from transmitter 10. In the specific generator illustrated in FIG. 2, the connection polynominal is:

$$P(D) = D^2 + D^5 + D^6 \qquad \text{Eq. 1}$$

Thus, the third, sixth and seventh stages of shift register 17 are connected to adder 18. It will of course be understood that the length, or number of stages, in shift register 17 is a second important factor which must be determined to decode messages from transmitter 10. A third factor which must be determined to aid in synchronization once the length and connection polynominal are known is the contents of the various stages of register 17 at any specific instant.

The spread spectrum signal produced by transmitter 10 and transmitted through antenna 15 is received by antenna 21 and supplied to demodulator/filter 22. The demodulator removes the carrier and the filter removes noise and the like which has been added during transmission. The unmodulated spread spectrum signal is then supplied to a predictor 23 and a first input of a mixer 25. Predictor 23 estimates the length, connection polynominal and the contents of the shift register in generator 12 and supplies these estimates to a local variable length linear feedback shift register 24 which operates as a pseudo random noise generator. The pseudo random signal from generator 24 is applied to a second input of mixer 25. The output of mixer 25 is applied to an input of an energy detector 26 and to an output 30 of receiver 20. Energy detector 26 supplies a signal to predictor 23 which orders predictor 23 to start a new estimate, hold the present estimate, or continue operating.

Predictor 23 will generally be a computer programmed with any of a variety of well-known iterative algorithms designed to make the required estimates. However, in the present embodiment the Berlekamp-Massey iterative algorithm is utilized because it is believed to be optimum. The Berlekamp-Massey algorithm is specifically described in IEEE *Transactions on Information Theory*, Vol. IT-15, #1, January 1969, pp. 122-127. Very briefly, the Berlekamp-Massey algorithm operates by selecting a first plurality of consecutive bits from demodulator/filter 22, generally these bits will be stored in an input buffer of the computer. A calculation is made as to the smallest possible shift register (length) that could produce the selected bits. A connection polynominal is selected in accordance with some predetermined plan and an estimate of the next bit is made in accordance with this connection polynominal. The next bit is then entered into the computer and checked to determine if the estimate was correct. If the estimate is incorrect, the required length is recalculated with the new bit and the connection polynominal and estimate steps are repeated. This process is continued until some number of bits, for example 4, are correctly estimated. When the required number of correct estimates is completed, the estimated length, estimated connection polynominal and estimated contents are transmitted to variable length shift register 24.

A typical variable length shift register which may be utilized as register 24 is illustrated in FIG. 3. Generator 24 includes a shift register 32 having at least as many stages as will ever be required to decode a signal. A plurality of switches 33 are associated with the stages of shift register 32 so that each stage of register 32 is connected through a switch 33 to a modulo 2 adder 34. Switches 33 have an input 35, labeled C(D) for the connection polynominal, which receives a signal designed to activate the correct switches to connect only the desired stages of register 32 to adder 34. In this example, if the correct C(D) is estimated the third, sixth and seventh switches will be activated to connect the third, sixth and seventh stages of register 32 to adder 34. A second plurality of switches 36 connect an output of each stage of shift register 32 (except the first stage) to an output 37 of generator 24. The switches 36 have an input 38 adapted to receive the estimated length signal thereon. Input 38 is adapted to activate only the switch associated with the desired last stage of the estimated shift register. In the present example, input 38 will activate switch number 7 of switches 36 so that the output of the seventh stage of register 32 is connected to output 37. Thus, the register of generator 24 is effectively seven stages long. In addition, register 32 has an input 39 for receiving an estimate of the contents of the shift register producing the code, S(D), which contents are produced in predictor 23 and entered into register 32 at a relatively high clock rate. Also, register 32 has a standard clock input for receiving a clock signal in synchronism with the signal from demodulator/filter 22.

Once predictor 23 has correctly estimated the required number of bits and supplied the length, connection polynominal and contents signals to generator 24, a pseudo random signal is produced by generator 24 and is mixed with the spread spectrum signal from demodulator/filter 22 in mixer 25. If the estimated signals are correct the pseudo random signal from generator 24 will completely despread the spread spectrum signal from demodulator/filter 22 and the output will be the data d supplied by data source 11. This output from mixer 25 is supplied to energy detector 26 which measures the instantaneous total energy in the signal and compares it to a threshold to determine whether the signal has sufficient energy to be correctly despread. In the present embodiment, energy detector 26 is a sequential energy detector similar to that described in *Digital Communications and Spread Spectrum Systems*, Ziemer, Peterson, McMillian Pub. Co., 1985, Ch. 10.

A graphical representation of the operation of a sequential energy detector is illustrated in FIG. 4. Briefly, a time varying lower threshold, line 42, is calculated and a time varying upper threshold, line 43, is calculated. Thresholds 42 and 43 vary with time because the likelihood of an estimate being correct becomes less as more of the message is intercepted. For example, if the pseudo random noise signal from generator 24 does not despread the signal from demodulator/filter 22 sufficiently to raise the energy above threshold 42 in the first instance, it is not likely that the same estimates will be perceptively better when the next bit of message is received. Further, since the message is a digital signal and each bit is essentially a one or a zero, the chances of guessing at a bit correctly are 50-50, which chances must be excluded from the threshold by raising the threshold each time a bit is estimated incorrectly. To incorporate this factor threshold 43 raises at a slightly greater rate than threshold 42. Any time the total energy in the signal from mixer 25 is below threshold 42 a signal is supplied to predictor 23 and the entire process is started again by rejecting the initially selected bits and selecting a new plurality of consecutive bits. Any time the total energy of the signal from mixer 25 exceeds threshold 43 a signal is supplied by detector 26 to predictor 23 which halts predictor 23 with the three estimated signals maintained at the instant values. When neither threshold 42 nor threshold 43 is exceeded predictor 23 continues to operate on the initial bits selected and to update the estimations supplied to generator 24.

Thus, apparatus for despreading a spread spectrum signal produced by a linear feedback shift register is disclosed, which apparatus is capable of despreading the signal after a single correct estimate of the original spreading code and which also synchronizes the despreading signal with the incoming signal to reduce the time required for despreading to a minimum. By utilizing an instantaneous measure of total energy in the despread signal, the estimates produced by the predictor are checked in an absolute minimum of time.

While we have shown and described a specific embodiment of this invention, further modification and improvements will occur to those skilled in the art. We desire to be understood, therefore, that this invention is not limited to the particular form shown and we intend in the appended claims to cover all modifications which do not depart from the spirit and scope of this invention.

What is claimed:

1. Apparatus for despreading a spread spectrum signal produced by a linear feedback shift register, comprising:
   input means for receiving a signal and providing a spread spectrum signal at an output thereof;
   a predictor connected to receive the spread spectrum signal from the output of said input means and to provide as output signals an estimate of the length of the shift register, an estimate of the connection polynominal of the shift register, and an estimate of the contents of the shift register producing the spread spectrum signal;

a variable length linear feedback shift register connected to receive the three output signals from said predictor and providing a pseudo random signal in response thereto on an output thereof;

a mixer connected to receive the spread spectrum signal from said input means and the psuedo random signal from said variable length feedback shift register and provide an output signal which is a mixture thereof; and an energy detector connected to receive the output signal from said mixer, to periodically measure the instantaneous total energy in the output signal, and to provide an output signal responsive to the measure of instantaneous total energy in the output signal from said mixer, the energy detector output signal being connected to said predictor to cause said predictor to save final estimates when the measure of instantaneous total energy reaches a predetermined level.

2. Apparatus for despreading a spread spectrum signal produced by a linear feedback shift register as claimed in claim 1 wherein the predictor includes a computer programmed in accordance with the Berlekamp-Massey iterative algorithm.

3. Apparatus for despreading a spread spectrum signal produced by a linear feedback shift register as claimed in claim 1 wherein the energy detector includes a sequential energy detector having upper and lower levels that change with time.

4. Apparatus for despreading a spread spectrum signal produced by a linear feedback shift register as claimed in claim 1 wherein the input means includes a demodulator to remove the carrier and filters for at least partially removing noise.

5. A method of despreading a spread spectrum digital signal, spread by utilizing a linear feedback shift register, comprising the steps of:

selecting a number of consecutive bits from the spread spectrum digital signal to be despread;

using an iterative algorithm to estimate the shortest number of stages the shift register could have from the selected number of bits, a connection polynominal of the shift register, and the contents of the shift register at the time the selected number of bits was produced;

providing a simultated spreading signal from a linear feedback shift register using the estimated shortest number of stages, connection polynominal, and contents;

mixing the simulated spreading signal with the spread spectrum digital signal to be despread;

measuring the instantaneous total energy in the signal resulting from the mixing step; and comparing the instantaneous total energy to a precalculated, time varying set of upper and lower energy levels.

6. A method as claimed in claim 5 including the step of selecting a new number of consecutive bits and performing the remaining steps, using an iterative algorithm, providing a simulated spreading signal, mixing the simulated spreading signal, measuring the instantaneous total energy, and comparing the instantaneous total energy, again when the instantaneous total energy drops below the lower energy level during the comparing step.

7. A method as claimed in claim 5 including the step of indicating that the current estimations are correct when the instantaneous total energy exceeds the upper level.

8. A method as claimed in claim 5 including the step of adding at least one additional bit to the selected number of consecutive bits and performing the remaining steps, using an iterative algorithm, providing a simulated spreading signal, mixing the simulated spreading signal, measuring the instantaneous total energy, and comparing the instantaneous total energy, again when the instantaneous total energy remains between the upper and lower energy levels during the comparing step.

9. A method as claimed in claim 5 including the steps of receiving a transmitted signal, demodulating the received signal to remove the carrier, and filtering the demodulated signal to at least partially remove noise, prior to performing the selecting step.

10. A method as claimed in claim 5 wherein the iterative algorithm used in the Berlekamp-Massey iterative algorithm.

* * * * *